(12) United States Patent
Hartmann et al.

(10) Patent No.: US 8,997,328 B2
(45) Date of Patent: Apr. 7, 2015

(54) METHOD IN WHICH A LINE CONNECTOR BY A FASTENING DEVICE IS FASTENED TO A LINE FOR LIQUID AND/OR GASEOUS MEDIA

(75) Inventors: Harald Hartmann, Dornbirn (AT); Werner Bachmann, Hard (AT)

(73) Assignee: Henn GmbH & Co KG., Dornbirn (AT)

( * ) Notice: Subject to any disclaimer, the term of this patent is extended or adjusted under 35 U.S.C. 154(b) by 296 days.

(21) Appl. No.: 13/582,117

(22) PCT Filed: Jan. 28, 2011

(86) PCT No.: PCT/AT2011/000047
§ 371 (c)(1),
(2), (4) Date: Sep. 12, 2012

(87) PCT Pub. No.: WO2011/106805
PCT Pub. Date: Sep. 9, 2011

(65) Prior Publication Data
US 2013/0009393 A1    Jan. 10, 2013

(30) Foreign Application Priority Data
Mar. 4, 2010 (AT) .................................... 343/2010

(51) Int. Cl.
*B23P 19/04* (2006.01)
*F16L 13/14* (2006.01)
*F16L 33/213* (2006.01)

(52) U.S. Cl.
CPC .............. *F16L 13/147* (2013.01); *F16L 33/213* (2013.01); *F16L 2201/10* (2013.01)

(58) Field of Classification Search
CPC ... F16L 2201/10; F16L 33/213; F16L 37/147; F16L 37/88; F16L 37/23; F16L 37/0987; F16L 37/0925; Y10S 285/921

USPC ........ 29/462.5, 464, 505, 515, 516, 521, 523, 29/623.5, 890.144; 72/370.1, 370.11, 72/370.12; 285/184.27, 308, 311, 320, 285/373, 38.2, 382.4, 382.7
See application file for complete search history.

(56) References Cited

U.S. PATENT DOCUMENTS

| 5,025,546 A | 6/1991 | Gotoh et al. |
| 5,964,023 A | 10/1999 | Simpson et al. |

(Continued)

FOREIGN PATENT DOCUMENTS

| DE | 199 56 000 | 1/2001 |
| DE | 10 2005 028558 | 1/2007 |

(Continued)

OTHER PUBLICATIONS

International Search Report of PCT/AT2011/000047, date of mailing May 23, 2011.

*Primary Examiner* — Alexander P Taousakis
*Assistant Examiner* — Lee A Holly
(74) *Attorney, Agent, or Firm* — Collard & Roe, P.C.

(57) ABSTRACT

The invention relates to a method, wherein a line connector (1), in particular a plug connector, by a fastening device (2) is fastened to a line (3) for liquid and/or gaseous media, wherein during or after the fastening of the line connector (1) to the line (3), a blocking body (4) already present on the line connector (1) and/or on the line (3) is removed from the line connector (1) and/or from the line (3) by means of the fastening device (2), wherein the blocking body (4) prevents a mating connector (5) from being connected to the line connector (1) as long as the blocking body is present on the line connector (1) and/or on the line (3).

16 Claims, 10 Drawing Sheets

(56) References Cited

U.S. PATENT DOCUMENTS

Figure 4:
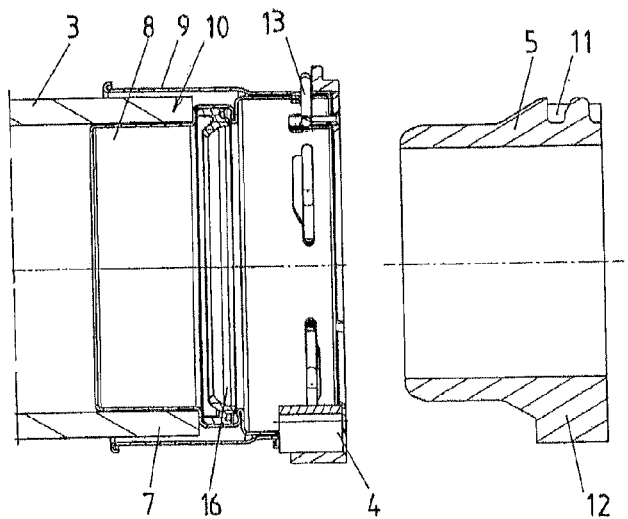

| | | |
|---|---|---|
| 6,672,628 B2 * | 1/2004 | Thomas et al. ............... 285/320 |
| 6,715,800 B1 | 4/2004 | Hennig |
| 7,975,373 B2 | 7/2011 | Hartmann et al. |
| 8,752,272 B2 | 6/2014 | Hartmann et al. |
| 2009/0026764 A1 | 1/2009 | Beckmann et al. |
| 2009/0218814 A1 | 9/2009 | Kern et al. |

FOREIGN PATENT DOCUMENTS

| | | |
|---|---|---|
| EP | 1 762 312 A1 | 3/2007 |
| EP | 2 019 243 | 1/2009 |
| EP | 2 154 411 A1 | 2/2010 |

* cited by examiner

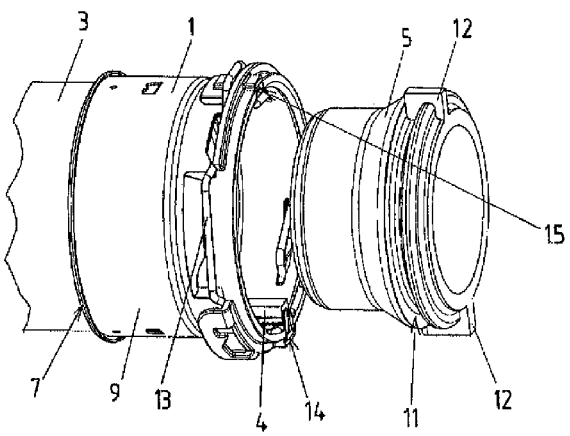
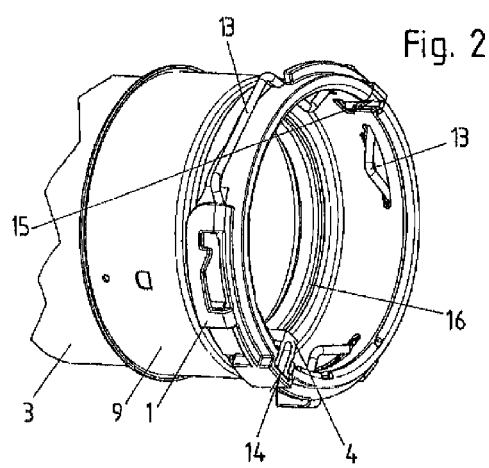
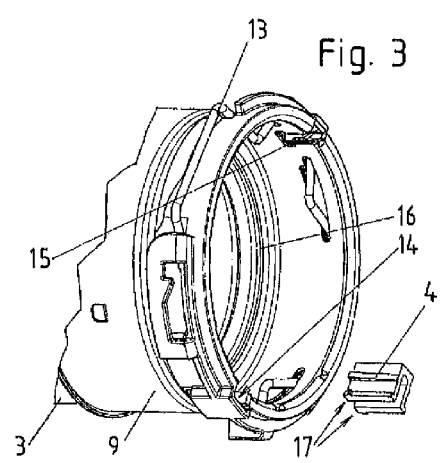

METHOD IN WHICH A LINE CONNECTOR BY A FASTENING DEVICE IS FASTENED TO A LINE FOR LIQUID AND/OR GASEOUS MEDIA

CROSS REFERENCE TO RELATED APPLICATIONS

This application is the National Stage of PCT/AT2011/000047 filed on Jan. 28, 2011, which claims priority under 35 U.S.C. §119 of Austrian Application No. A 343/2010 filed on Mar. 4, 2010, the disclosure of which is incorporated by reference. The international application under PCT article 21(2) was not published in English.

The invention relates to a method, wherein a line connector, in particular a plug connector, by fastening device is fastened to a line for liquid and/or gaseous media. Moreover, the invention also relates to a line connector as well as a fastening device as such.

From prior art methods have been known, wherein line connectors of fastening devices are fastened to a line for liquid and/or gaseous media. Such line connectors are frequently referred to as sockets and serve for connecting lines. In conjunction with the corresponding mating connector, which can for example be connected to another line, generic line connectors can form a screw connection, a bayonet joint or suchlike. Frequently, line connectors of this kind are plug connectors, which are connected to one another by plugging.

Using generic methods, line connectors and line require to be connected firstly and to be inserted into the fastening device for performing the final fastening subsequently. This process is frequently done manually by the operating personnel. Practice has shown that errors on the side of the operating personnel occur. Thus, it for example happens that the line connector is inserted into the fastening device without being previously connected to a line. Moreover, it can occur that the respective operating person loosely connected line connector and line however, but does not insert them into the fastening device, with the result that the actual fastening process does not take place. As a result, the line is only loosely held on the line connector, which cannot necessarily be seen at the first sight. If the line connector and the line are then brought to their final use, it results that the line disconnects from the line connector during the first build-up of pressure in the line, thus probably resulting in considerable damage.

The underlying objective of the present invention is to improve the generic methods so as to allow errors to be recognized in sufficient time before the operation of line including line connector brought to their final use.

This is according to the invention achieved by, during or after fastening the line connector to the line, removing a blocking body already present on the line connector and/or the line from the line connector and/or the line by means of a fastening device, wherein the blocking body prevents a mating connector from being connected to the line connector as long as the blocking body is present on the line connector and/or then line.

It is thus a basic idea of the invention to provide a blocking body on the line connector and/or the line, which blocking body is removed by the fastening device during or after the fastening of the line to the line connector. As long as the blocking body is present on the line connector and/or the line, it prevents the line connector from being connected to a corresponding mating connector. This ensures that the line connector in its final use can only be connected to a mating connector if the fastening device has firmly connected line connector and the line to one another according to the specifications. Only if this is ensured, the blocking body has been removed. In the event that the blocking body is still present, for example if the operating personnel has connected the line to the line connector, but has not inserted them into the fastening device, the blocking body prevents the line connector from being connected to the mating connector in order to allow the error to be recognized in good time.

In order to avoid misapplication it is particularly provided that the blocking body is fixed to the line connector and/or the line in such a way that it cannot be removed manually but only by means of the fastening device.

The invention can be applied to many different kinds of line connectors. The latter can be parts of a screw connection, a bayonet joint or suchlike. It is particularly preferred for the line connectors according to the invention to be plug connectors, according to which line connectors and mating connectors form a plug connection, i.e. are connected by being plugged into one another.

With embodiments according to the invention, the blocking body can by removed from the line connectors and/or the line by means of the fastening device in many different kinds and ways. For a first group of embodiments it is provided for the blocking body to be removed from the line connector and/or the line by means of the fastening device by, in the broadest sense, being detached from the line connector and/or the line. If the blocking body is embodied to be an individual component, it can be e.g. drawn from and/or screwed off the line connector and/or the line by means of the fastening device. It is furthermore possible for the blocking body to be formed integrally with the line connector and/or the line. In this case, the variants according to the invention for example provide for the blocking body to be cut off and/or broken off the line connector and/or the line. In the sense of the invention, removing the blocking body can also be performed in another way. It is e.g. possible for the fastening device to remove the blocking body from the line connector and/or the line by, preferably plastically, deforming the line connector and/or the line. With these variants, the blocking body is thus usually integrally formed as a part of the line connector and/or the line. Removing in the sense of this invention is with these variants performed by deforming the line connector and/or the line in such a way that the mating connector can be connected to the line connector subsequently. In this case, it is not absolutely necessary to remove a part.

It can be adapted to the respective requirements which relative motions between the fastening device on the one hand and the line connector and the line on the other hand are performed during the process of removing the blocking body. It is thus possible for the line connector and the line to remain in a home position and the fastening device or a part of it is moving while the blocking body is removed. It is vice versa also possible for the fastening device is remaining in a home position during the process of removal, only holding the blocking body, so that the removal of the blocking body is effected when line connector and line are detached from the fastening device.

Particular advantageous embodiments of the method according to the invention provide for the line connector and line to be connected to each other by means of, preferably plastic, deformation, for example by being pressed together. This can for example be achieved by the fastening device having at least one deformation tool, and at least sections of the line connector and/or the line being, preferably plastic, are deformed by the deformation tool in order to fasten the line connector to the line. Particularly preferred variants provide for the blocking body to be removed from the line connector and/or the line by means of the deformation tool. Also in this case, there are several possibilities for the relative motion between the deformation tool and the line connector and/or the line while the blocking body is being removed.

In order to check the quality of the fastening of the line connector to the line before the blocking member is removed, preferred embodiments of the method according to the invention provide for the fastening device to check by means of at least one control parameter whether the line connector has been fastened to the line, before the blocking body is removed. For this purpose, many different parameters can be used. It is e.g. possible for the or at least one of the control parameters to be a control parameter characteristic for the fastening process. In this connection, it can e.g. be provided for forces and/or stretches of way used during the fastening process, preferably deformation process, in or on the fastening device to be used as a control parameter characteristic for the fastening process. The or one of the control parameters can nevertheless also include checking whether line is present or not.

The term line is to be understood in a general way. It can e.g. be created by a more or less flexible hose or essentially rigid pipe. It is used for transporting liquid and/or gaseous media. It can also be a section of a line.

By means of line connectors according to the invention, e.g. sections of coolant lines of combustion engines or charge air lines of combustion engines can be connected. Within these, a pressure of up to 6 bar is present.

A line connector according to the invention, which can particularly be used for a method according to the invention, provides for the line connector to have a blocking body, which can be removed from the line connector, preferably without deforming other components of the line connector, with the blocking body, as long as being present on the line connector, preventing a mating connector from being connected to the line connector. The fact that the blocking body can be removed without deforming other components of the line connector should be understood here in such a way that during the removal of the blocking body from the line connector, no relevant deformations of other components of the line connector takes place, with the result that the line connector is fully functional and not deformed or unusable in any other way after the blocking body has been removed. This can easily be checked by connecting the mating connector to the line connector. Line connectors according to the invention can also be referred to as sockets, also as plug-in sockets if they are formed as a plug connection. In this case, they can be male or female line connectors. If the fastening of the line to the line connector is effected by plastic deformation, at least sections of the line connectors are preferably embodied to be deformable. In this sense, the line connectors can be a component being formed from sheet metal either in sections or completely. With line connectors according to the invention it is preferably provided for the blocking body to be fastened as an individual component to other components of the line connector by means of a snap-lock connection and/or a frictionally locking connection and/or a screw connection. Other embodiments of line connectors according to the invention provide for the blocking body to be formed integrally with the line connector, with a predetermined breaking point being formed between the blocking body and the components of the line connector surrounding the or holding the latter.

In addition to the method according to the invention and the line connector according to the invention, the invention also relates to a fastening device for fastening a line connector, in particular a plug connector, to a line which is characterized by the fact that the fastening device has a blocking member removal device for removing a blocking body having been present on the line connector and/or line in advance during or after fastening the line connector to the line, with the blocking body preventing a mating connector from being connected to the line connector, as long as said blocking body is present on the line connector and/or the line. A fastening device of this kind can thus particularly be used with a method according to the invention. Preferred embodiments provide for the blocking body removal device not to be formed as an additional component but e.g. as a deformation tool or to be used as deformation protrusion.

Preferred embodiments of the line connector and/or the fastening device according to the invention result from the descriptions of the method according to the invention and its preferred embodiments.

Figure 5:
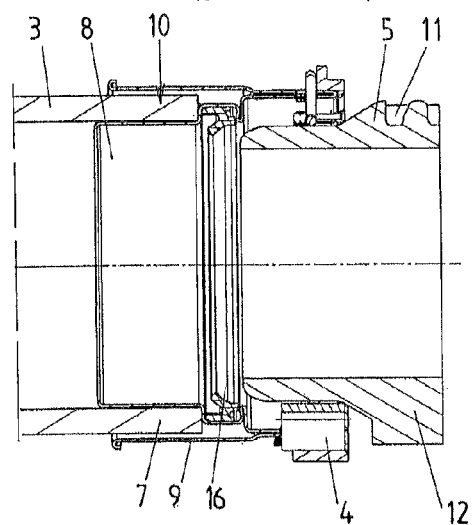
Figure 6:
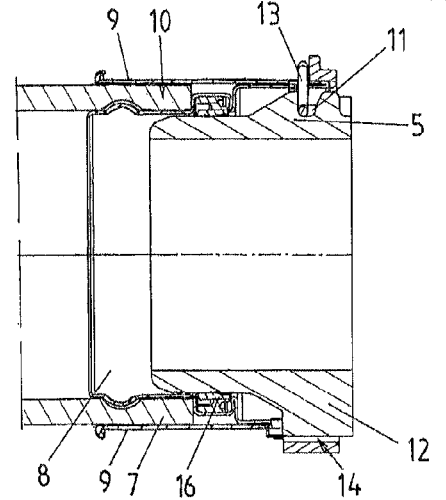

Further details and features of preferred embodiments of the invention result from the following description of the figures. These show:

FIGS. 1 and 2 an example of a line connector embodied according to the invention on a line with the blocking body not having been removed;

FIG. 3 the same line connector, with the blocking body having been removed from the line connector;

FIGS. 4 to 6 different sectional views through the line connector, the line and the mating connector and FIGS. 7 to 14 a sequence of procedural steps, showing how line connector and line can be fastened to one another in a way according to the invention.

FIGS. 1 and 2 each show perspective views of the line connectors 1 and the line 3 or a section thereof. Here, the line connector 1 has however been plugged onto the end section 7 of the line 3, but not finally fastened to the line 3 yet. This state e.g. occurs, if the end section 7 has been inserted into the mounting cavity 10 visible in the FIGS. 4 to 4, but the final fastening of the line connector 1 to the line 3 by means of fastening device 2 has not been carried out. In order to avoid that the line connector 1 and the line 3 in this state are accidentally processed according to their final use, the blocking body 4 is disposed on the line connector 1 in the exemplary embodiment shown. It prevents the mating connector 5 in FIG. 1 from being connected to the line connector 1 in the usual way.

In the exemplary embodiment shown, the line connector 1 the female part of a plug connection is represented by a socket. In the example shown, this socket 1 is largely embodied to be a deformed sheet metal part of a sheet metal. In the exemplary embodiment shown, a sealing 16 is disposed within the interior of the line connector 1, which sealing rests against the mating connector 5 when the latter is in its fully assembled state. Furthermore, the line connector 1 of this exemplary embodiment has a catch spring 13, which is provided for engaging the notch 11 of the mating connector 5, when the latter is inserted completely into the line connector 1. In this state, the mating connector 5 is thus held in the line connector 1 by means of the catch spring 13. This is however only possible if the blocking body 4 has been removed in advance according to the invention. According to the invention, this is in turn only possible if the line connector 1 and the line 3 are finally fastened to one another.

In the exemplary embodiment shown, two keying bodies 12 are disposed on the mating connector 5, which keying bodies serve for ensuring that the mating connector 5 and the line connector 1 can be connected in only one position. For accommodating the keying bodies 12, the recesses 14 and 15 are formed in the line connector 1. The mating connector 5 can nevertheless only be connected to the line connector 1, after the blocking body 4, in exemplary embodiment shown disposed in the recess 14, has been removed. The keying bodies 12 and the recesses 14 and 15 can also be omitted with other embodiments of the invention.

FIG. 3 shows the line connector 1 in the state, where the blocking body 4 has been removed from it by withdrawing from the recess 14. In FIG. 3, the notches 17 being present on the blocking body 4 in this exemplary embodiment can be seen, which notches represent the part of the snap-lock connection of this exemplary embodiment holding the blocking body 4 in the line connector 1 before it is removed out of the line connector 1 by the fastening device 2. FIGS. 4 and 5 show a sectional view through the line connector 1, line 3 and mating connector 5 in a state, where the line connector 1 and the line 3 are plugged into one another, but not fastened to one another completely yet. In this state, the blocking body 4 is still present, so that the mating connector 5, as particularly shown in FIG. 5, cannot be inserted into the line connector 1 completely and can therefore not be connected to the latter completely. It can easily be seen in the sectional views that the walls 8 and 9 of the line connector 1 of this exemplary embodiment form an annular mounting cavity 10, where the end section 7 of the line 3 is inserted into. For the sake of completeness it is noted that, derogating from the example shown, at least one of the walls 8 and 9 do not require to be connected integrally with the rest of the line connector 1. At least one of the walls 8 or 9 can also be formed to be a detachable ring or suchlike. The upper keying body 12 and the thereto allocated recess 15 in the line connector 1 cannot be seen in FIGS. 4 to 6, since they do not exist in the sectional view shown.

In the state shown in FIG. 6, the line 3 is completely fastened to the line connector 1. In the exemplary embodiment shown, the fastening has been effected by deforming the line connector 1 and the line 3 in the region of the walls 8 and 9 of the line connector 1 and the end section 7 of the line 3. After this fastening had been completed, the blocking body 4 was removed by the fastening device 2, with the result that the mating connector 5 can be connected to the line connector 1 completely. As it can be taken from FIG. 6, in this state, the lower keying body 12 is completely inserted into the recess 14, where the blocking body 4 was present before. Furthermore, the catch spring 13 engaged the groove 11 of the mating connector 5 in order to hold the latter on the line connector 1. The sealing 16 seals the connection between the line connector 1 and the mating connector 5.

FIGS. 7 to 14 show a sequence of procedural steps. There is an example showing how a line 3 and a line connection 1 are fastened to one another by means of a fastening device 2 according to the invention, as shown in FIGS. 1 to 6, and subsequent to such a fastening, the blocking body 4 is removed from the line connector 1 by means of the fastening device 2. In the exemplary embodiment shown, the line connector 1 and the line 3 are deformed together in order to be fastened to one another. The final state reached is also shown in sectional view in FIG. 6. The fastening device 2 used in the exemplary embodiment shown has a housing, which can be displaced relative to the opposing retaining jaws 18 and the connector carrier 19. In order to perform this displacement, not explicitly shown, electrical, hydraulic or pneumatic drives known per se can be used, just to name a few possible examples. Within the housing 23 of the fastening device 2 shown, there is a press pin 20 having a tip 21, which serves for operating the deformation tool 6. The press pin 20 and its tip 21 can be displaced relative to the housing 23, and therefore also relative to the deformation tool 6 in longitudinal direction of the press pin 20. For this purpose, also hydraulic, pneumatic or electrical or other drives can be used, which are not explicitly shown in the schematic illustration. By displacing the press pin 20 and its tip 21 relative to the housing 23 and to the deformation tool 6, the latter is sufficiently forced apart and contracted again as well.

Figure 7:
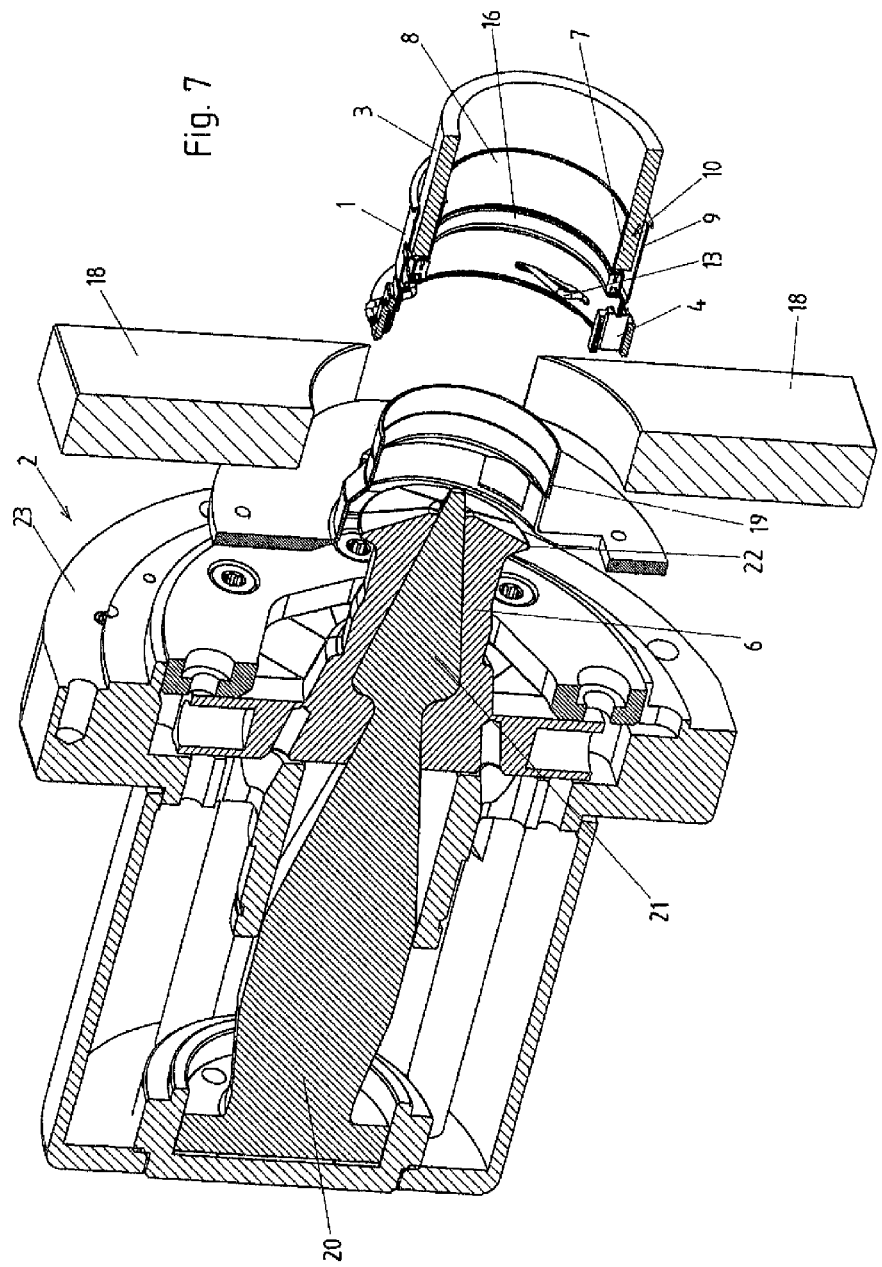

FIG. 7 firstly shows the initial situation. The housing 23 and the press pin 20 are in a retracted position. The opposing retaining jaws 18 are moved apart from each other and therefore in their opened position. The line 3 is already inserted into the mounting cavity 10 of the line connector 1, the actual connection between line 3 and line connector 1 has nevertheless not taken place yet. Accordingly, the blocking body 4 is still present on the line connector 1, which has not been plugged on the connector carrier 19.

Figure 8:
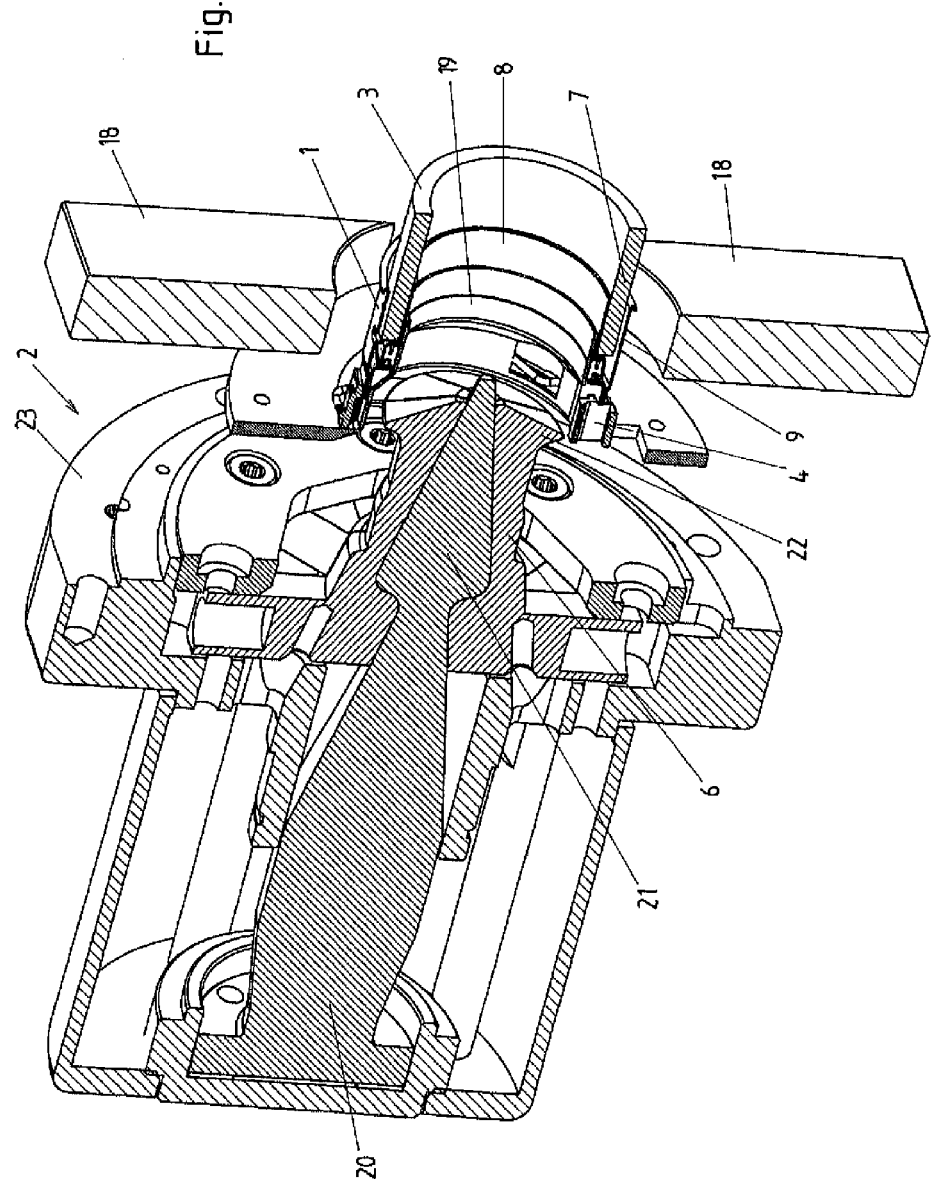
Figure 9:
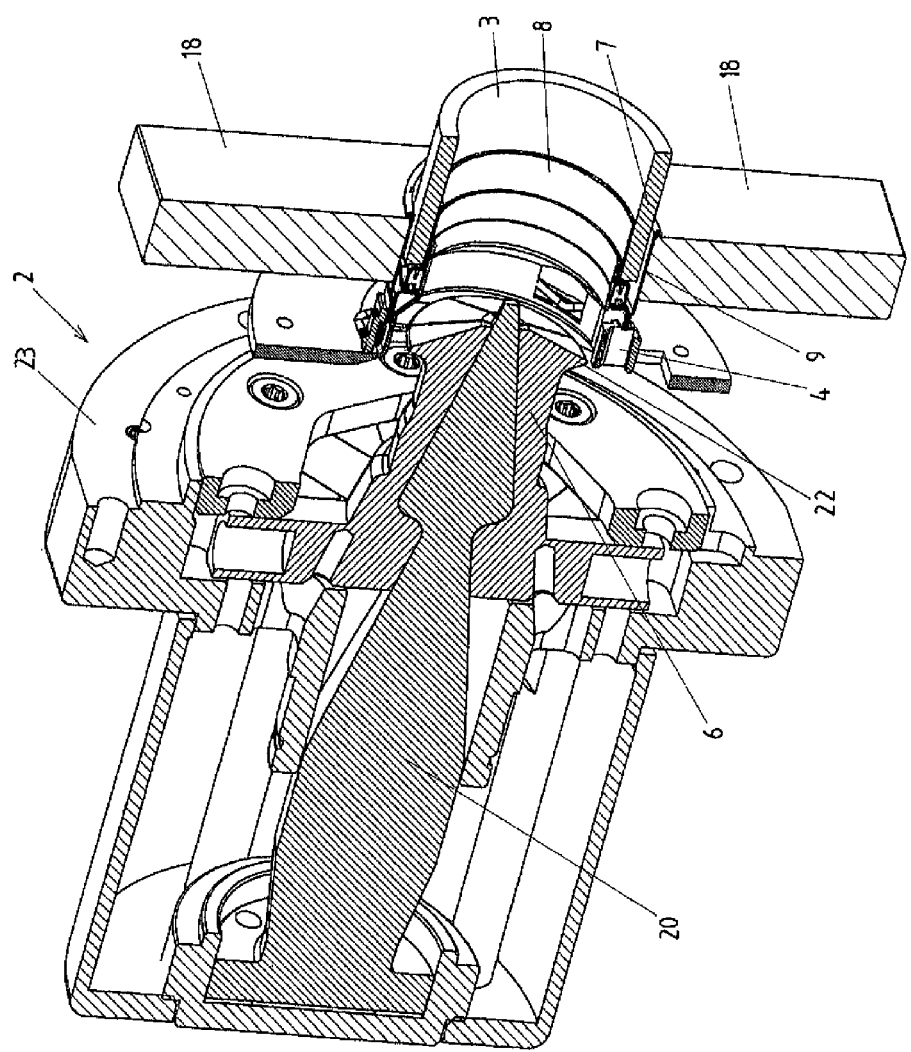
Figure 10:
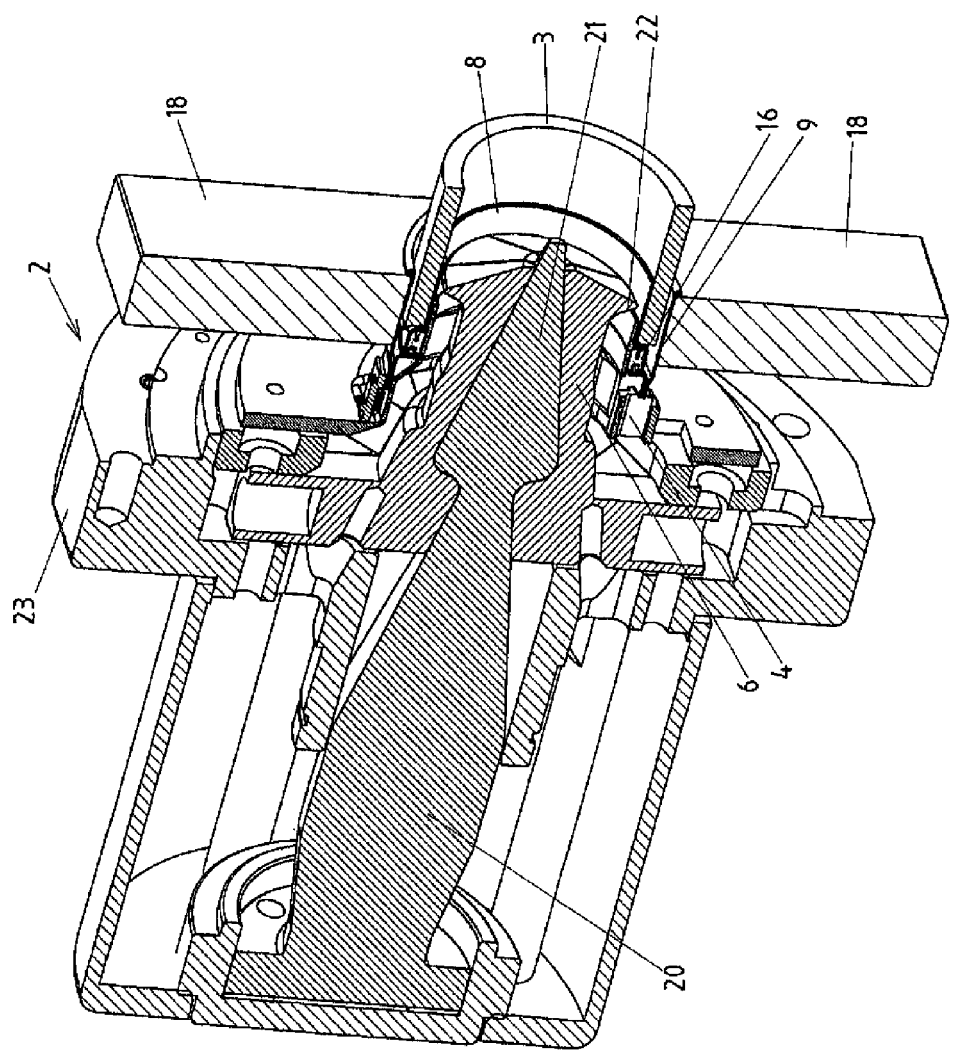
Figure 11:
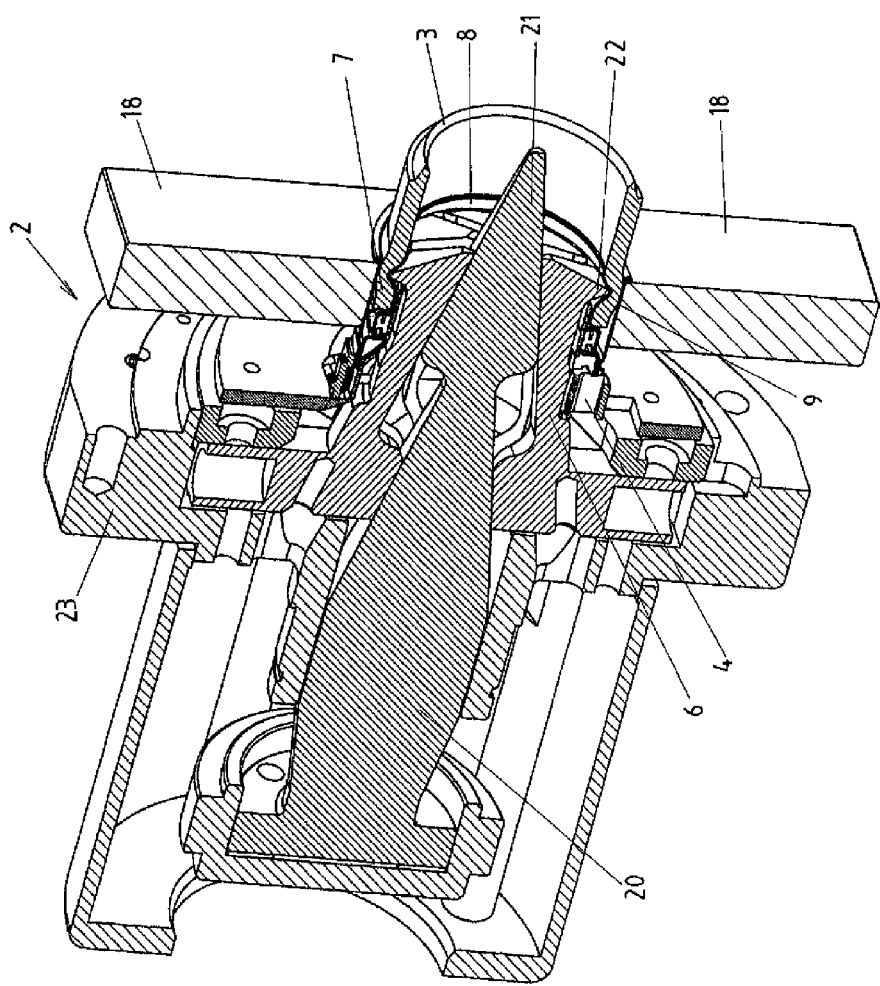

FIG. 8 shows the next procedural step. Press pin 20 and housing 23 have not been moved yet. The line connector 1 including line 3 has however been plugged to the connector carrier 19 of the fastening device 2. The opposing retaining jaws 18 are still in their opened position. In the next step, the opposing retaining jaws are 18 closed, with the result that they hold the line connector 1 in its position until they get opened in order to prevent the line connector 1 from being pulled off ahead of time. The opposing retaining jaws 18 can also be used for taking opposing forces during the removal of the blocking body 4 described below. In addition, it is also possible to provide for the wall 9 of the line connector 1 to be supported by the opposing retaining jaws 18 radially in outward direction. The state with closed opposing retaining jaws 18 is shown on FIG. 9. Subsequently, the housing 23 including press pin 20 is displaced in the direction towards the connector carrier 19 thus bringing the deformation tool 6 in the position, where it has to deform the line connector 1 and the line 3 together in following procedural steps, in order to fasten these components to one another (see FIG. 10). FIG. 11 shows the final state after the deformation. For deforming, the deformation protrusions 22 of the deformation tool 6 were pressed into the interior wall 8 of the line connector 1, with the result that they were plastically deformed together with the line 3 in the clearly visible way in the sectional view chosen. During this deformation process, the opposing retaining jaws 18 have prevented the outer wall 9 of the line connector 1 from being bent outwardly. After the deformation process is completed, the line connector 1 is finally fastened to the line 3. The forcing apart of the deformation tool 6 is effected by displacing the press pin 20 including tip 21 in the direction towards the line connector 1 relative to the housing 23.

Figure 12:
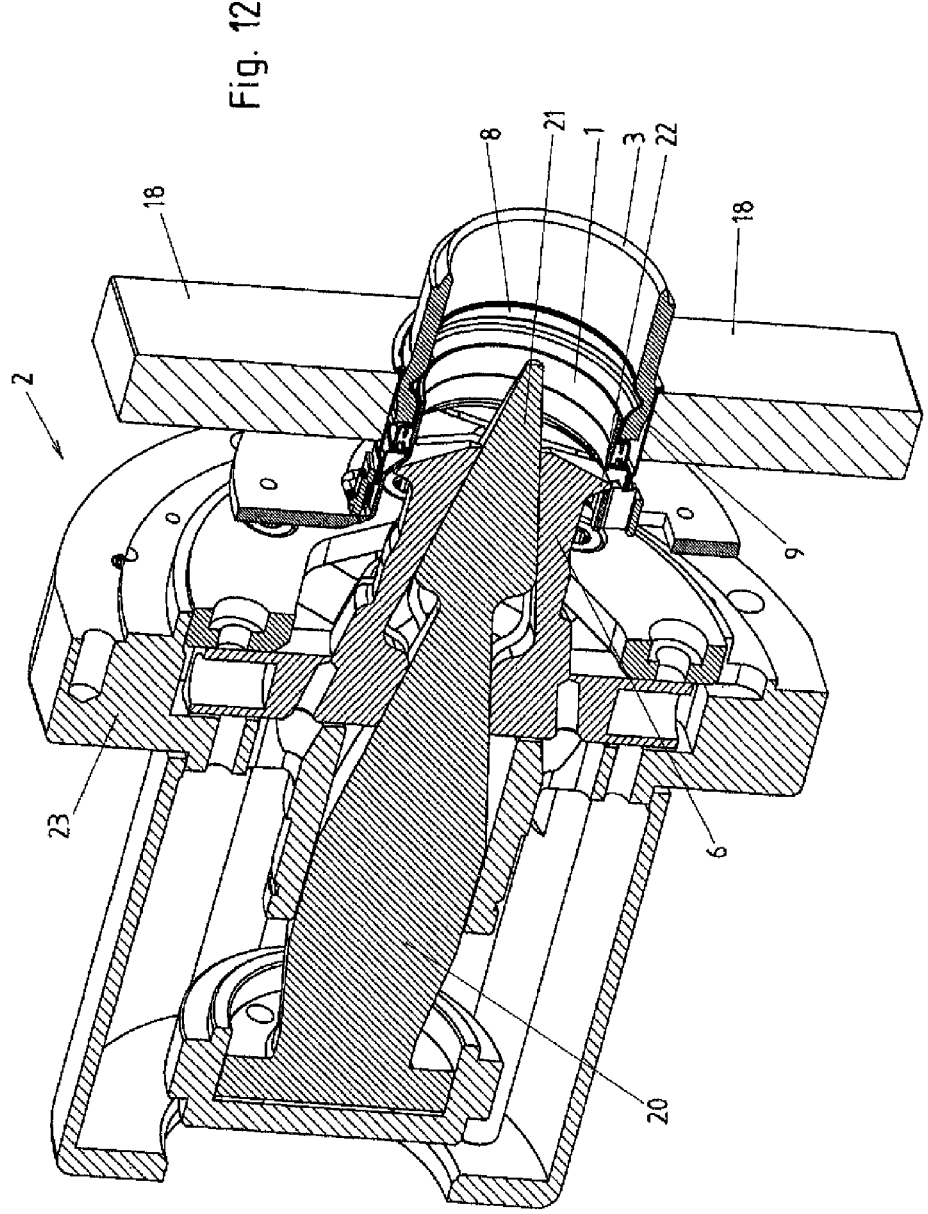
Figure 13:
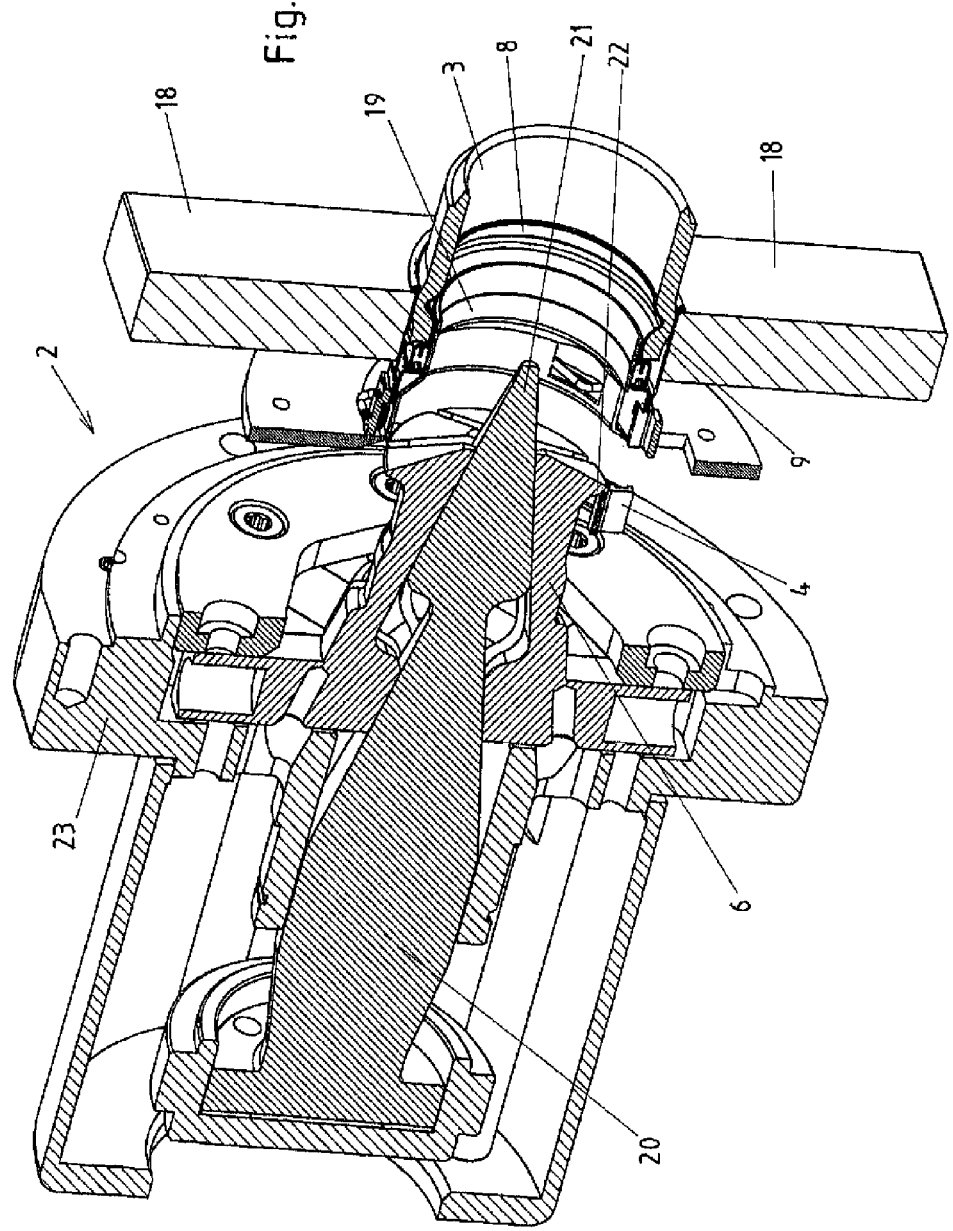
Figure 14:
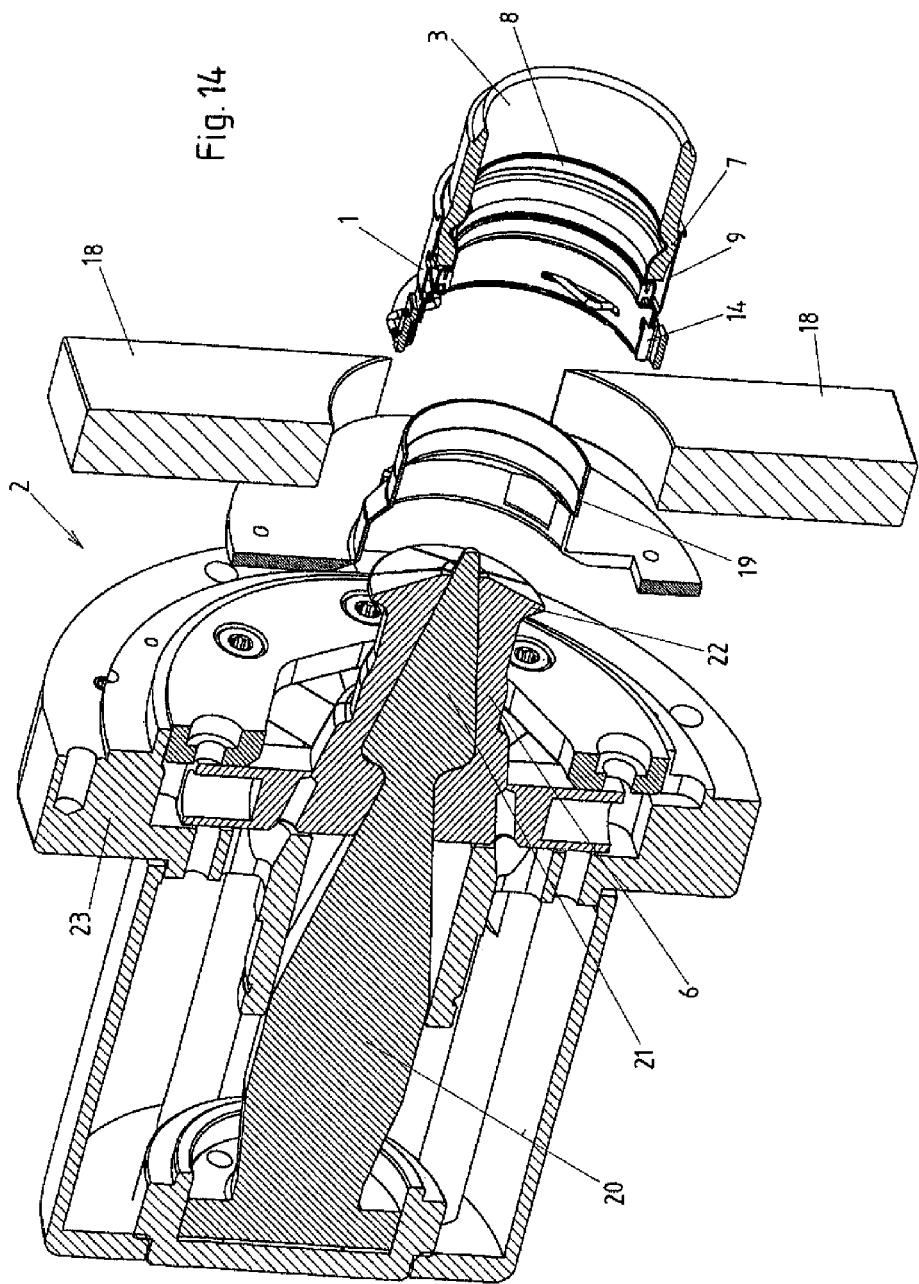

By means of known per se, but here not shown sensors, the fastening device can check, whether the deformation process has been carried out in the desired way. The forces used at the press pin 20 and/or the distance traveled can be used as control parameters, for example. Force and/or distance can in this case be measured as a function of temperature, in the event that this is of importance for the checking of the deformation process. It can furthermore checked by an installation not shown, whether the line 3 is present or not. Also other control parameters are possible. Depending on the result of the check, a corresponding closed-loop control facility of the fastening device can then decide, whether the blocking body should be withdrawn from the line connector 1 or not. In this case, the blocking body 4 in the exemplary embodiment shown is withdrawn from the line connector 1 by retracting the housing 23 including press pin 20 by means of the deformation tool 6. FIG. 12 shows the position, where the deformation tool 6 is just engaging the blocking body 4 by means of a deformation protrusion 22. In the exemplary embodiment shown, the deformation protrusion 22 and the blocking body removal device of the fastening device are thus the same component. This is not absolutely required to be the case. With alternative embodiments, e.g. also opposing retaining jaws 18 can be used as blocking body removal device. In the exemplary embodiment shown, the blocking body 4 is removed or withdrawn from the line connector 1 by further retracting the housing 23 including press pin 20 and deformation tool 6 in direction away from the line connector, on the basis of the position shown in FIG. 12. FIG. 13 shows this state. Subsequently, the opposing retaining jaws 18 can be opened and the line connector 1 including line can be withdrawn from the connector carrier 19. This is shown in FIG. 14. There it can also be seen that the blocking body 4 is currently not blocking the recess 14 of this exemplary embodiment of this line connector 1, with the result that the mating connector 5 can be connected to the line connector 1 in the way shown in FIG. 6.

LIST OF REFERENCE NUMERALS

1 Line connector
2 Fastening device
3 Line
4 Blocking body
5 Mating connector
6 Deformation tool
7 End section
8 Wall
9 Wall
10 Mounting cavity
11 Groove
12 Indexing bodies
13 Catch spring
14 Recess
15 Recess
16 Sealing
17 Notch
18 Opposing retaining jaws
19 Connector carrier
20 Press pin
21 Tip
22 Blocking body removal device
23 Housing

The invention claimed is:

1. A method of fastening comprising:
fastening by a fastening device a line connector to a line for liquid and/or gaseous media,
wherein during or after the fastening of the line connector to the line, a blocking body already present on the line connector and/or the line is removed from the line connector and/or the line via the fastening device, with the blocking body preventing a mating body from being connected to the line connector as long as the blocking body is present on the line connector and/or the line.

2. The method according to claim 1, wherein the fastening device has at least one deformation tool, with at least sections of the line connector and/or the line being deformed by the deformation tool in order to fasten the line connector to the line.

3. The method according to claim 2, wherein the blocking body is removed from the line connector and/or from the line via the deformation tool.

4. The method according to claim 2, wherein the line is inserted into a mounting cavity limited by walls of the line connector.

5. The method according to claim 1, wherein before the removal of the blocking body, the fastening device checks via at least one control parameter, whether the line connecter has been fastened to the line.

6. The method according to claim 5, wherein the at least one control parameter is a parameter characteristic for the fastening process and/or wherein the at least one control is to check whether the line is present.

7. The method according to claim 6, wherein forces and/or stretches of way used in or on the fastening device are consulted as control parameter characteristic for the fastening process during the fastening process.

8. The method according to claim 1, wherein for removing the blocking body from the line connector and/or from the line via the fastening device, the blocking body is drawn off and/or screwed off and/or cut off and/or broken off the line connector and/or the line and/or the removal of the blocking body is effected via the fastening device via deformation of the line connector and/or the line.

9. A line connecting device comprising:
a line connector;
a blocking body, which is detachably coupled to the line connector and can be removed from the line connector; and
a mating connector which can be connected to the line connector
wherein
when the blocking body is coupled to the line connector, the blocking body is configured to prevent the mating connector from being connected to the line connector.

10. The line connecting device according to claim 9, wherein the mating connector can be connected to the line connector by plugging.

11. The line connecting device according to claim 9, wherein the mating connector can be connected to the line connector by screwing.

12. The line connecting device according to claim 9, wherein the blocking body can be removed from the line connector without deforming other components of the line connector.

13. The line connecting device according to claim 9, wherein the line connector has a recess in which the blocking body is disposed.

14. The line connecting device according to claim 13, wherein the recess is positioned in an inner wall of the line connector.

15. The line connecting device according to claim 9, wherein the blocking can be withdrawn from the line connector in an axial direction of the line connector.

16. The line connecting device according to claim 13, wherein the blocking body has a protrusion and the recess has a holding grove which corresponds with the protrusion wherein the blocking body is slideable connected to the line connector.

* * * * *